US008265896B2

(12) United States Patent
Yang

(10) Patent No.: US 8,265,896 B2
(45) Date of Patent: Sep. 11, 2012

(54) TRACK DETECTION DEVICE AND TRACK DETECTION METHOD THEREOF

(75) Inventor: Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 386 days.

(21) Appl. No.: 12/615,194

(22) Filed: Nov. 9, 2009

(65) Prior Publication Data
US 2011/0040520 A1 Feb. 17, 2011

(30) Foreign Application Priority Data
Aug. 12, 2009 (CN) .......................... 2009 1 0305545

(51) Int. Cl.
G06F 15/00 (2006.01)
G06F 3/033 (2006.01)
G06F 3/041 (2006.01)
(52) U.S. Cl. ...................... 702/150; 345/167; 178/18.01

(58) Field of Classification Search ................. 702/150, 702/57, 64–67, 81, 84, 94–95, 127, 182, 702/189; 324/76.11, 76.75, 200, 207.11, 324/239, 658, 660–661, 663; 345/163–164, 345/167; 178/18.01, 18.06–18.08; 33/700, 33/708, 711, 772
See application file for complete search history.

(56) References Cited

U.S. PATENT DOCUMENTS
5,920,307 A * 7/1999 Blonder et al. ............... 345/167

FOREIGN PATENT DOCUMENTS
CN 1641692 7/2005
* cited by examiner

Primary Examiner — Toan M Le
(74) Attorney, Agent, or Firm — Altis Law Group, Inc.

(57) ABSTRACT

A track detection device includes an insulating spherical housing including an inner surface, a plurality of electrostatic induction units embedded within the insulating spherical housing and evenly spaced around a center of the insulating spherical housing, a charged ball moveably attracted to the inner surface of the insulating spherical housing, and a processor electrically connected to the plurality of electrostatic induction units. The plurality of electrostatic induction units generate electrical signals when the charged ball rolls along the inner surface at a portion of the insulating spherical housing where the electrostatic induction unit is embedded. The processor is configured for detecting a track of the charged ball moving inside the insulating spherical housing according to the electrical signals.

11 Claims, 6 Drawing Sheets

TRACK DETECTION DEVICE AND TRACK DETECTION METHOD THEREOF

BACKGROUND

1. Technical Field

The present disclosure relates to track detection technologies and, particularly, to a track detection device and a track detection method thereof.

2. Description of Related Art

Referring to FIG. 6, a track detection device 100 includes a track ball 110, two shafts 140, 150 orthogonally positioned on two sides of the track ball 110, two sleeve barrels 160, 170 sleeved on one end of the two shafts 140, 150, two encoding assemblies 180, 190 sleeved on the other end of the two shafts 140, 150, and two light breakers 120, 130 for receiving the two encoding assemblies 180, 190 respectively. The track ball 110 abuts the two sleeve barrels 160, 170 respectively at the two orthogonal sides of the track ball 110. The encoding assemblies 180, 190 include a plurality of blades.

When the sleeve barrels 160, 170 rotate with rotation of the track ball 110, the shafts 140, 150 also rotate with the sleeve barrels 160, 170. The encoding assemblies 180, 190 rotate to block or transmit light signals emitted from emitters of the light breakers 120, 130, and then receivers of the corresponding light breakers 120, 130 receive the transmitted light. Therefore, the light breakers 120, 130 can determine the movement of the track ball 110 according to the received light signals. However, the track detection device 100 in such a configuration occupies too much space.

Therefore, what is needed is to provide a compact track detection device and a track detection method thereof, in which the above-mention problems are eliminated or at least alleviated.

BRIEF DESCRIPTION OF THE DRAWINGS

The components of the drawings are not necessarily drawn to scale, the emphasis instead being placed upon clearly illustrating the principles of the embodiments of the simulated eye assembly. Moreover, in the drawings, like reference numerals designate corresponding parts throughout several views

DETAILED DESCRIPTION

Figure 1:
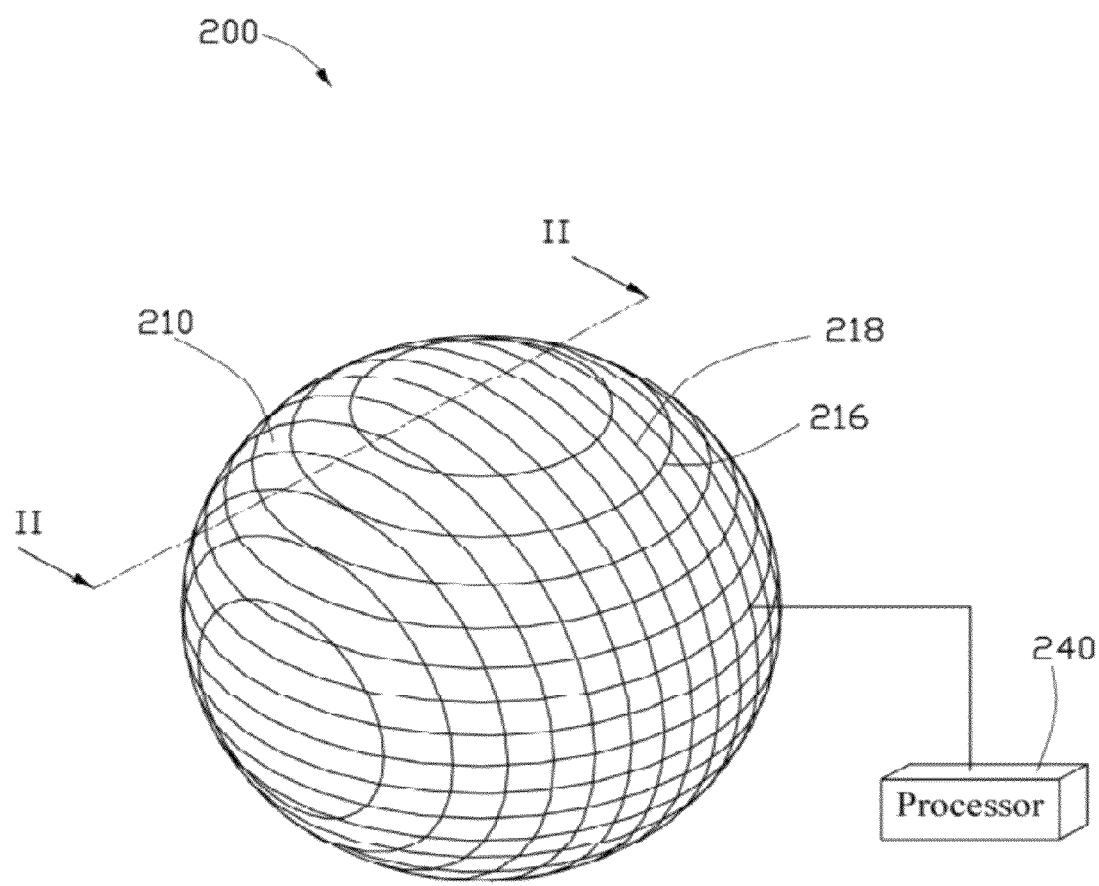
FIG. 1 is a schematic isometric view of a track detection device including a processor, according to a first exemplary embodiment.
Figure 2:
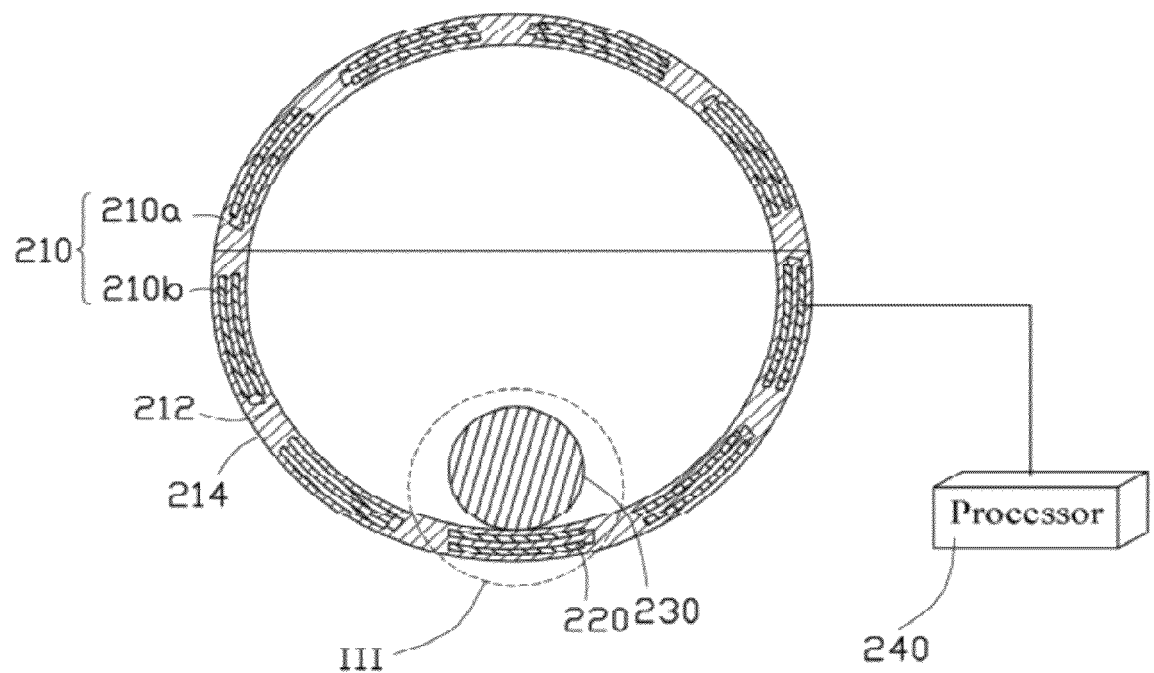
FIG. 2 is a cross-section view taken along line II-II of the track detection device of FIG. 1.

Referring to FIGS. 1 and 2, a track detection device 200 used in a portable electronic device (not shown), according to a first exemplary embodiment, includes a hollow insulating spherical housing 210, a plurality of electrostatic induction units 220, a charged ball 230, and a processor 240. The insulating spherical housing 210 is fixed to the portable electronic device. The plurality of electrostatic induction units 220 are embedded within the insulating spherical housing 210 and evenly spaced around a center of the insulating spherical housing 210. The charged ball 230 is moveably attracted to an inner surface 212 of the insulating spherical housing 210. The processor 240 is electrically connected to the plurality of electrostatic induction units 220.

The insulating spherical housing 210 is made from an insulating material, such as plastic. The insulating spherical housing 210 includes an outer surface 214 on another side opposite to the inner surface 212. A plurality of first circular lines 216 and second circular lines 218 are arranged on the outer surface 214 equidistantly. The plurality of first circular lines 216 can be considered as lines of latitudes of the insulating spherical housing 210. The plurality of second circular lines 218 also can be considered as lines of latitudes of the insulating spherical housing 210 viewing from anther angle. The plurality of first circular lines 216 and the plurality of second circular lines 218 intersects to from a plurality of grids. In this embodiment, the insulating spherical housing 210 includes an upper hemisphere housing 210a and a lower hemisphere housing 210b. The upper hemisphere housing 210a is attached to the lower hemisphere housing 210b by adhesive.

The plurality of electrostatic induction units 220 are positioned at every intersections of the first circular lines 216 and the second circular lines 218 correspondingly. Further referring to FIG. 3, each electrostatic induction unit 220 includes a first electrode plate 222, a second electrode plate 224, and a wire 226. The first electrode plate 222 and the second electrode plate 224 are embedded within the insulating spherical housing 210 and evenly spaced around the center of the insulating spherical housing 210. The wire 226 electrically connects the first electrode plate 222 to the second electrode plate 224. The first electrode plate 222 is adjacent to the inner surface 212. The second electrode plate 224 is adjacent to the outer surface 214. The first and second electrode plates 222, 224 are curved plates parallel to the inner and outer surfaces 212, 214. As a result, an inner insulting layer 211, a middle insulting layer 213, and an outer insulting layer 215 are formed adjacent to each electrostatic induction unit 220. The inner insulting layer 211 is between the inner surface 212 and the first electrode plate 222. The middle insulating layer 213 is between the first electrode plate 222 and the second electrode plate 224. The outer insulting layer 215 is between the second electrode plate 224 and the outer surface 214. In particular, the upper hemisphere housing 210a and the lower hemisphere housing 210b may be made by an injection molding process, and the electrostatic induction unit 220 can be embedded within the insulating spherical housing 210 during the injection molding process.

The charged ball 230 is made from metal and is moveably attracted to the inner surface 212 of the insulating spherical housing 210. In particular, an electric-insulating magnetic material layer may be coated on the inner surface 212 of the insulating spherical housing 210 to generate a low magnetic field force. The charged ball 230 is attracted to the inner surface 212 by the low magnetic field force and rolls along the inner surface 212 when the portable electronic device moves.

Figure 3:
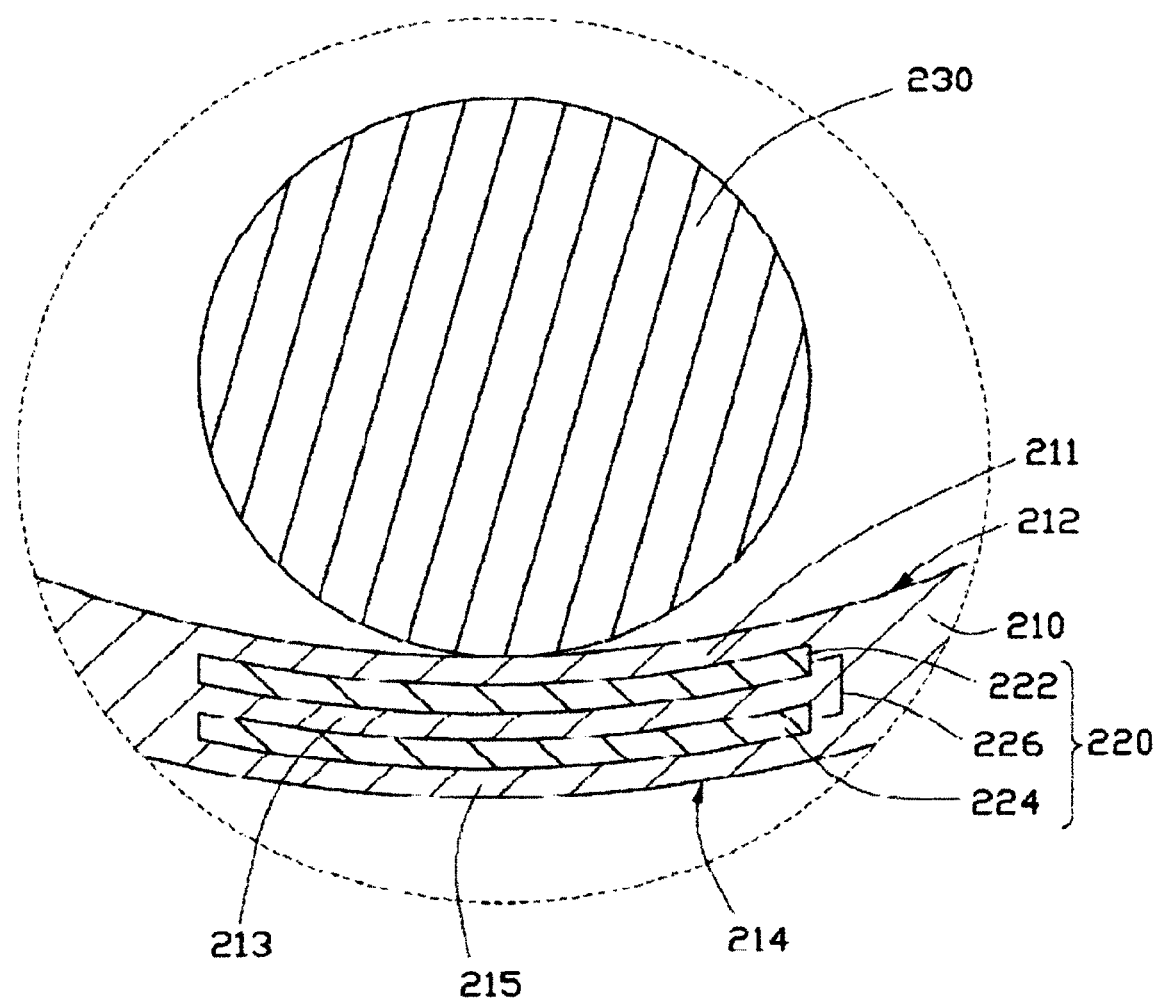
FIG. 3 is an enlarged view of section III of FIG. 2.

Referring to FIG. 3, when the charged ball 230 rolls along the inner surface 212 of the insulating spherical housing 210 adjacent the electrostatic induction unit 220, a static induction is generated between the charged ball 230 and the electrostatic induction unit 220. As a result, an electric potential difference between the first electrode plate 222 and the second electrode plate 224 is formed, and a current is generated and passes through the wire 226 due to the static induction. In this embodiment, the size of the first electrode plate 222 is same as or less than that of the second electrode plate 224.

Figure 4:
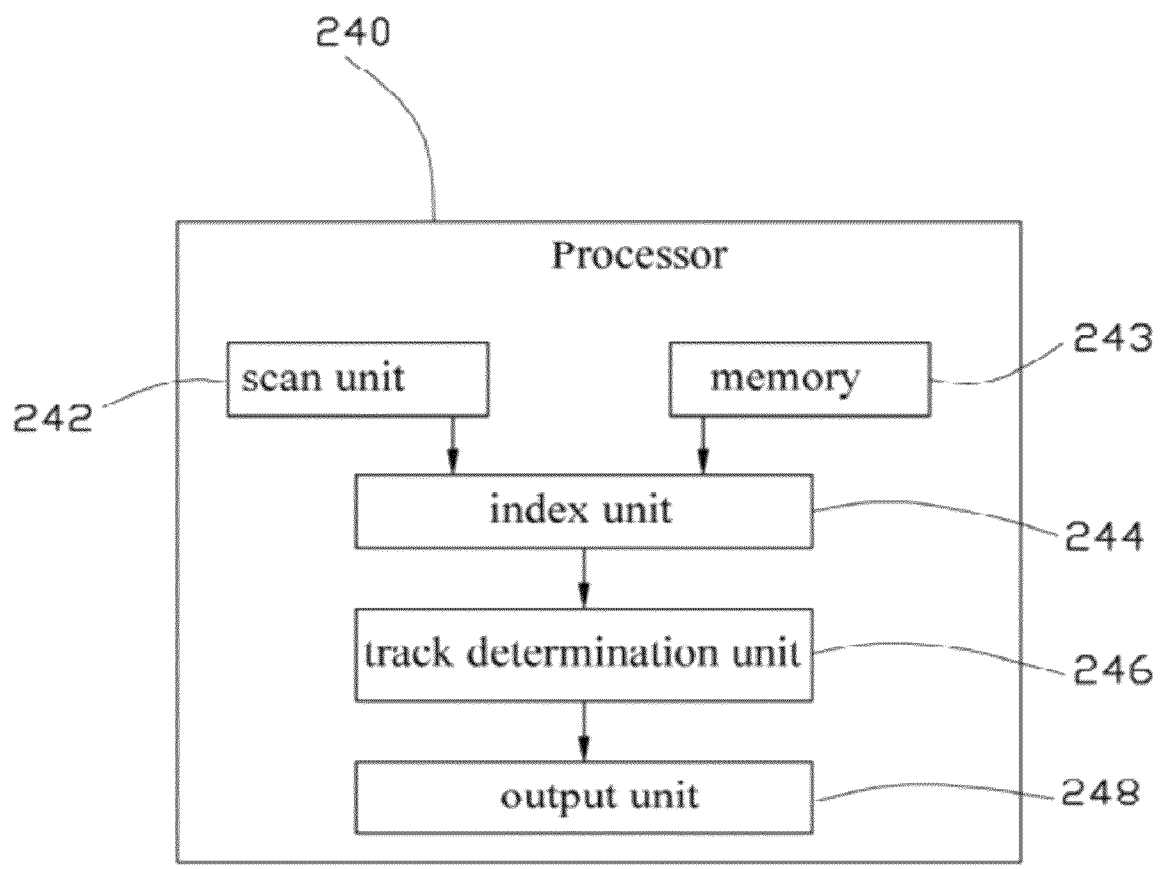
FIG. 4 is a functional block diagram of the processor of FIG. 1.

Referring to FIG. 3 together with FIG. 4, the processor 240 includes a scan unit 242, a memory 243, an index unit 244, a track determination unit 246, and an output unit 248.

The scan unit 242 is electrically connected to the wires 226 of the electrostatic induction units 220 and is configured for scanning the wires 226 of the electrostatic induction units 220 to determine which wires 226 have current flowing therethrough. The memory 242 is configured for storing pre-set location data of each electrostatic induction unit 220 within the insulating spherical housing 210. The index unit 244 is configured for indexing corresponding location data of the determined wires 226 of the electrostatic induction units 220 according to the pre-set location data of the electrostatic induction unit 220. The track determination unit 246 is configured for determining a track of the charged ball 230 moving inside the insulating spherical housing 210 according to the indexed location data. The output unit 248 is configured for outputting controlling signals according to the track of the charged ball 230. The controlling signals are processed as input signals to the portable electronic device.

Figure 5:
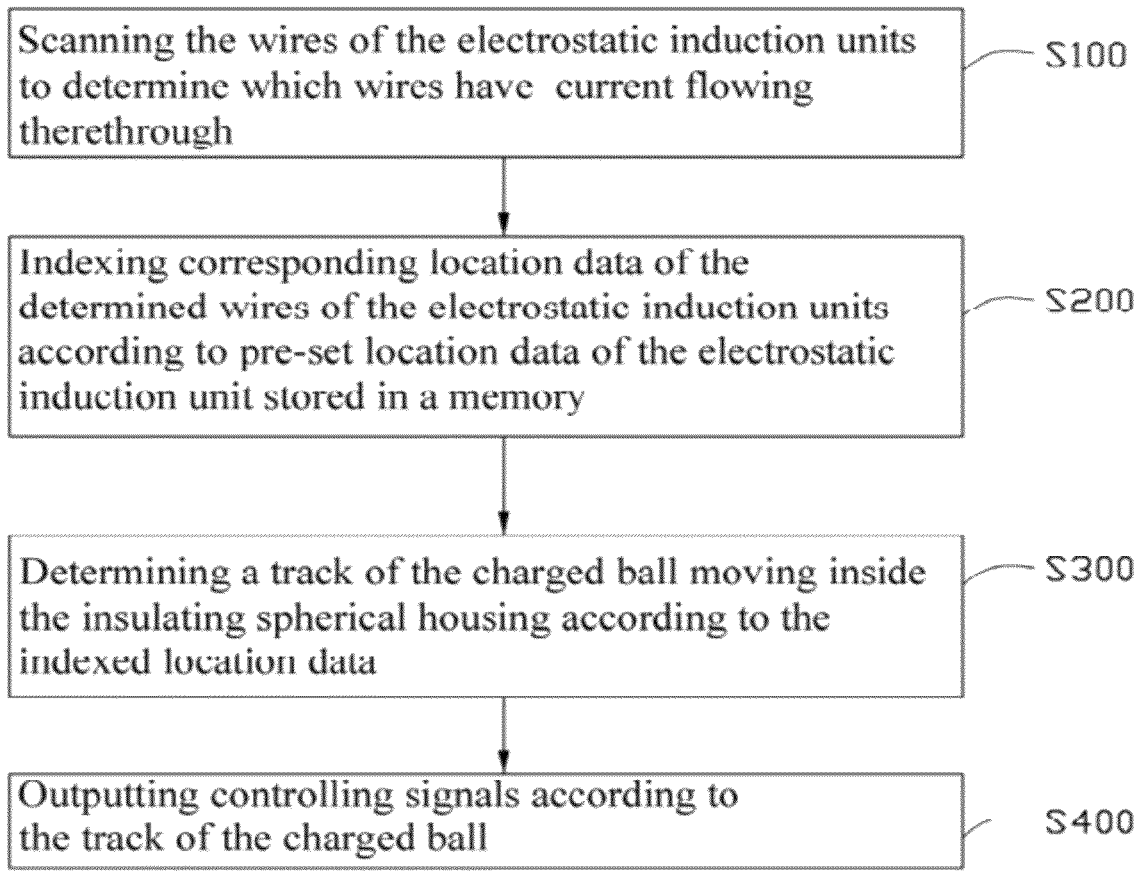
FIG. 5 is a flowchart of a track detection method, according to a second exemplary embodiment.
Figure 6:
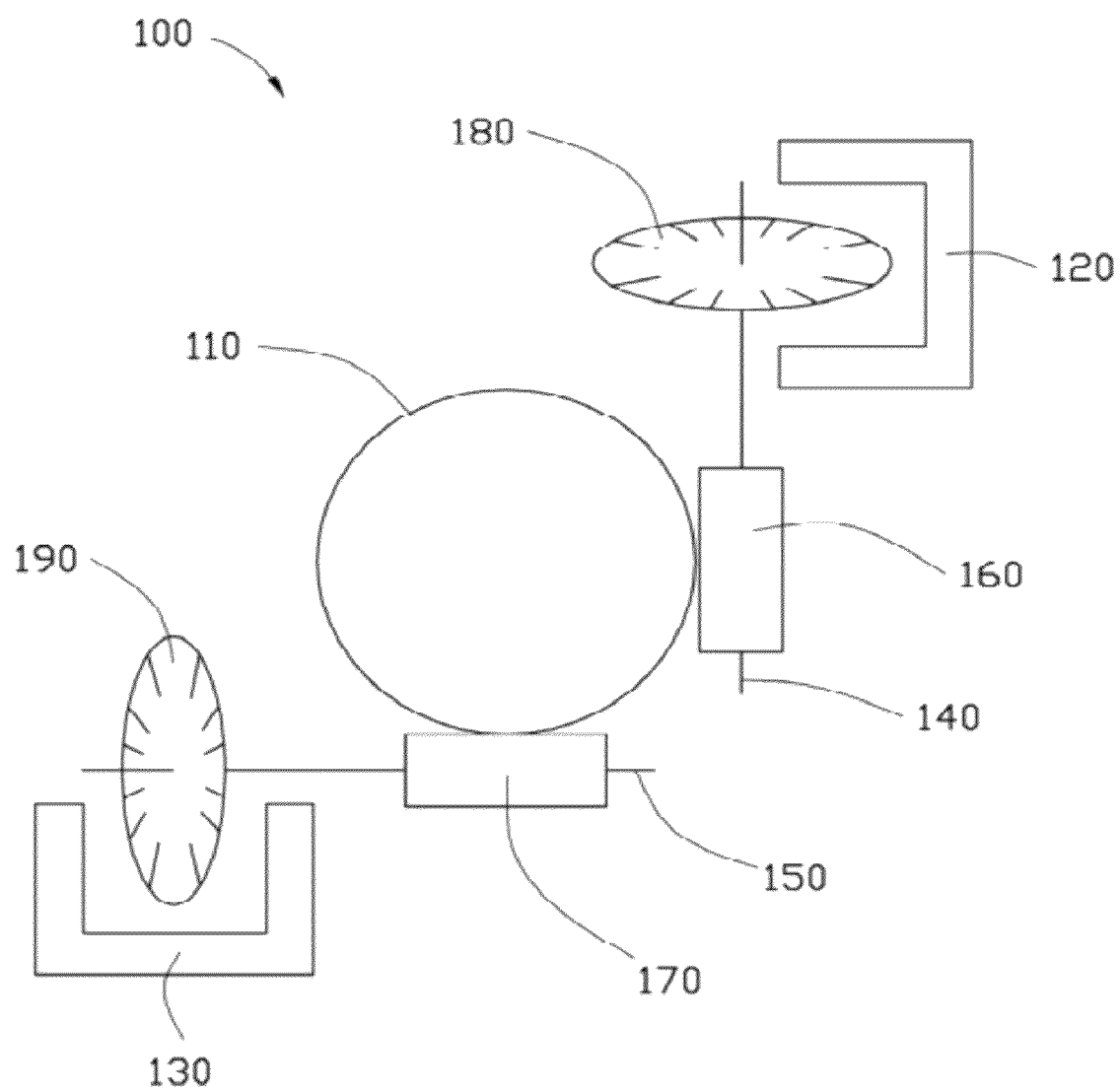
FIG. 6 is a schematic view of a related track detection device.

Referring to FIG. 5, a track detection method for detecting track of a charged ball moving inside an insulating spherical housing, according to a second exemplary embodiment, includes steps S100 through S400. Step S100: scanning the wires of the electrostatic induction units to determine which wires have current flowing therethrough. Step S200: indexing corresponding location data of the determined wires of the electrostatic induction units according to pre-set location data of the electrostatic induction unit stored in a memory. Step S300: determining a track of the charged ball moving inside the insulating spherical housing according to the indexed location data. Step S400: outputting controlling signals according to the track of the charged ball.

Since the track of the charged ball 230 is detected easily by detecting locations of the electrostatic induction unit 220 static-induced by the charged ball 230, a configuration of the track detection device 200 is simple. Accordingly, a compact track detection device 200 is achieved.

It is to be understood, however, that even though numerous characteristics and advantages of the present embodiments have been positioned fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A track detection device comprising:
   a hollow insulating spherical housing comprising an inner surface;
   a plurality of electrostatic induction units embedded within the insulating spherical housing and evenly spaced around a center of the insulating spherical housing;
   a charged ball moveably attracted to the inner surface of the insulating spherical housing, wherein a static induction is generated between the charged ball and the electrostatic induction unit when the charged ball rolls along the inner surface at a portion of the insulating spherical housing where the electrostatic induction unit is embedded, thus the plurality of electrostatic induction units generate electrical signals; and
   a processor electrically connected to the plurality of electrostatic induction units, and configured for detecting a track of the charged ball moving inside the insulating spherical housing according to the electrical signals.

2. The track detection device as claimed in claim 1, wherein a plurality of first circular lines and second circular lines are arranged on the insulating spherical housing equidistantly, the plurality of first circular lines are considered as lines of latitudes of the insulating spherical housing, and the plurality of first circular lines and the plurality of second circular lines intersects to from a plurality of grids, and the plurality of electrostatic induction units are positioned at intersections of the first circular lines and the second circular lines.

3. The track detection device as claimed in claim 1, wherein each electrostatic induction unit includes a first electrode plate, a second electrode plate, and a wire electrically connecting the first electrode plate to the second electrode plate, and the first electrode plate and the second electrode plate are embedded within the insulating spherical housing and evenly spaced around a center of the insulating spherical housing circumferentially.

4. The track detection device as claimed in claim 3, wherein the insulating spherical housing further comprises an outer surface opposite to the inner surface, the first electrode plate is adjacent to the inner surface, the second electrode plate is adjacent to the outer surface, the first and second electrode plates are curved plates parallel to the inner and outer surfaces.

5. The track detection device as claimed in claim 3, wherein the size of the first electrode plate is same as or less than that of the second electrode plate.

6. The track detection device as claimed in claim 3, wherein the electrical signals are currents flowing through the wire due to an electric potential difference between the first electrode plate and the second electrode plate according to a static induction generated between the charged ball and the electrostatic induction units.

7. The track detection device as claimed in claim 1, wherein the charged ball is made from metal.

8. The track detection device as claimed in claim 1, wherein an electric-insulating magnetic material layer is coated on the inner surface of the insulating spherical housing.

9. The track detection device as claimed in claim 1, wherein the processor comprises a scan unit configured for scanning the wires of the electrostatic induction units to determine which wires have current flowing therethrough, a memory configured for storing pre-set location data of each electrostatic induction unit within the insulating spherical housing, an index unit configured for indexing corresponding location data of the determined wires of the electrostatic induction units according to the pre-set location data of the electrostatic induction unit, a track determination unit configured for determining a track of the charged ball moving inside the insulating spherical housing according to the indexed location data, and an output unit configured for outputting controlling signals according to the track of the charged ball.

10. A track detection method for a track detection device, the track detection device comprising:
    a hollow insulating spherical housing comprising an inner surface;
    a plurality of electrostatic induction units embedded within the insulating spherical housing and evenly spaced around the center of the insulating spherical housing;
    a charged ball moveably attracted to the inner surface of the insulating spherical housing, wherein a static induction is generated between the charged ball and the electrostatic induction unit when the charged ball rolls along the inner surface at a portion of the insulating spherical housing where the electrostatic induction unit is embedded, thus the plurality of electrostatic induction units generate electrical signals; and a processor electrically connected to the plurality of electrostatic induction units, and configured for detecting a track of the charged ball moving inside the insulating spherical housing according to the electrical signals, the method comprising:

the processor scanning the wires of the electrostatic induction units to determine which wires that have current flowing therethrough;

the processor indexing corresponding location data of the determined wires of the electrostatic induction units according to pre-set location data of the electrostatic induction unit stored in a memory; and the processor determining a track of the charged ball moving inside the insulating spherical housing according to the indexed location data.

11. The track detection method as claimed in claim 10, further comprising the processor outputting controlling signals according to the track of the charged ball.

* * * * *